United States Patent
Jäckle et al.

(10) Patent No.: US 10,078,884 B2
(45) Date of Patent: Sep. 18, 2018

(54) SYSTEM AND METHOD FOR PROCESSING GEOGRAPHICAL INFORMATION WITH A CENTRAL WINDOW AND FRAME

(71) Applicants: Dominik Jäckle, Constance (DE); Stefan Hagen Weber, München (DE); Daniela Oelke, Riemerling (DE)

(72) Inventors: Dominik Jäckle, Constance (DE); Stefan Hagen Weber, München (DE); Daniela Oelke, Riemerling (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/976,827

(22) Filed: Dec. 21, 2015

(65) Prior Publication Data
US 2017/0178286 A1    Jun. 22, 2017

(51) Int. Cl.
*G06T 3/00* (2006.01)
*G06F 17/30* (2006.01)
*G06T 11/20* (2006.01)
*G01C 21/00* (2006.01)
*G06T 17/05* (2011.01)

(52) U.S. Cl.
CPC .......... *G06T 3/0025* (2013.01); *G01C 21/00* (2013.01); *G06F 17/30241* (2013.01); *G06F 17/30345* (2013.01); *G06F 17/30528* (2013.01); *G06F 17/30554* (2013.01); *G06T 11/206* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 6,392,661 B1 * | 5/2002 | Tankersley | G06F 3/0485 340/945 |
| 6,898,523 B2 * | 5/2005 | Cochlovius | G01C 21/3614 345/156 |
| 6,938,218 B1 * | 8/2005 | Rosen | G06F 3/04815 345/419 |
| 8,296,001 B1 * | 10/2012 | Kabel | G08G 3/02 340/988 |
| 8,817,018 B1 * | 8/2014 | Fan | G06T 17/05 345/419 |
| 2003/0080958 A1 * | 5/2003 | Matsumoto | G06T 15/405 345/421 |
| 2003/0142136 A1 * | 7/2003 | Carter | G06F 3/04815 715/782 |
| 2003/0151626 A1 * | 8/2003 | Komar | G06T 3/0018 715/767 |
| 2009/0048777 A1 * | 2/2009 | Ebert | G01C 21/3635 701/455 |

(Continued)

*Primary Examiner* — Jason Pringle-Parker
(74) *Attorney, Agent, or Firm* — Lempia Summerfield Katz LLC

(57) ABSTRACT

Processing geographical information includes storing geographical information including a map dataset and associated context dataset in a memory. A central window subset based on the map data set and the associated context dataset is extracted from the memory. A frame window subset based on an associated context dataset that is adjacent to the central window subset is extracted from the memory. The central window subset and the frame window subset are transferred to a graphics memory.

9 Claims, 7 Drawing Sheets

(56) References Cited

U.S. PATENT DOCUMENTS

| | | | | |
|---|---|---|---|---|
| 2011/0242102 | A1* | 10/2011 | Hess | B60K 35/00 |
| | | | | 345/419 |
| 2011/0310100 | A1* | 12/2011 | Adimatyam | G06F 3/017 |
| | | | | 345/420 |
| 2012/0008048 | A1* | 1/2012 | Sekine | G06T 19/006 |
| | | | | 348/566 |
| 2012/0226988 | A1* | 9/2012 | Sharma | G06F 3/04815 |
| | | | | 715/738 |
| 2013/0178257 | A1* | 7/2013 | Langseth | G06T 17/05 |
| | | | | 463/4 |
| 2015/0293354 | A1* | 10/2015 | Oishi | G08G 1/095 |
| | | | | 345/7 |

* cited by examiner

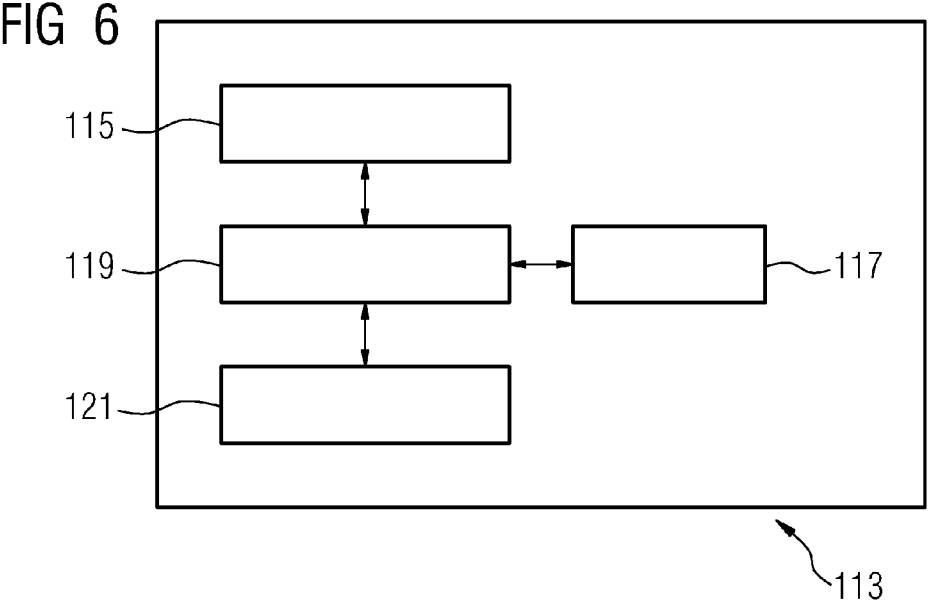
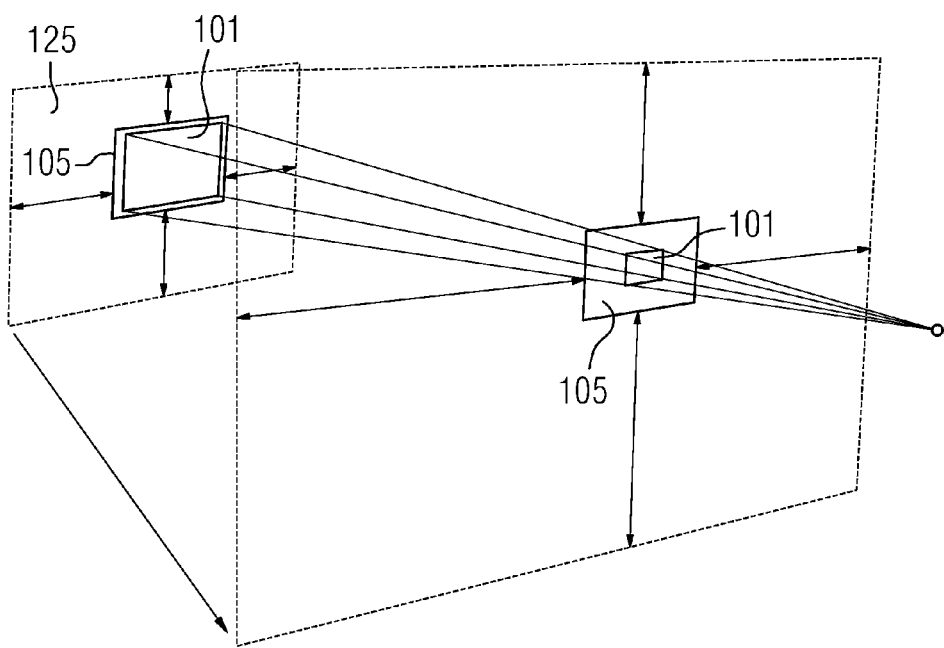

SYSTEM AND METHOD FOR PROCESSING GEOGRAPHICAL INFORMATION WITH A CENTRAL WINDOW AND FRAME

BACKGROUND

The present embodiments relate to processing geographical information.

One of the main problems of focus+context techniques with respect to maps techniques is that data amounts are huge and distorted presentation of data is not intuitively. Therefore, it is difficult to estimate angles and distances of objects shown in a frame window with respect to objects shown in a central window.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the amount of data to be transferred to a graphics memory is reduced without losing relevant information.

According to a first aspect, a method for processing geographical information includes storing geographical information including a map dataset and associated context dataset in a memory. A central window subset based on the map data set and the associated context dataset is extracted from the memory. A frame window subset based on the associated context dataset that is adjacent to the central window subset is extracted from the memory. The central window subset and the frame window subset are transferred to a graphics memory. By only considering the context dataset for generating the frame window, data to be transferred to a graphics memory may be reduced. The central window dataset and the frame window dataset may be transferred rapidly to remote devices. All relevant information is still contained within the central window dataset and the frame window dataset.

In one embodiment of the method, the frame window subset surrounds the central window subset. This embodiment has the technical advantage that context data from all directions is considered.

In a further embodiment of the method, the context dataset is updated dynamically. This embodiment has the technical advantage that real-time information is gathered.

In a further embodiment of the method, the frame window subset is calculated from the associated context dataset before transferring to the graphics memory. This embodiment has the technical advantage that context data may be processed accordingly.

In a further embodiment of the method, the calculation is performed by projecting the associated context dataset on the side faces of a square or rectangular frustum. This embodiment has the technical advantage that distances and angles may be recognized easily.

In a further embodiment of the method, the central window subset and the frame window subset are displayed on a screen. This embodiment has the technical advantage that a graphical representation of the central window subset and the frame window subset is given.

In a further embodiment of the method, objects defined by the context dataset are represented as icons. This embodiment has the technical advantage that information may be recognized easily and objects may be referenced with few data.

In a further embodiment of the method, the size of the icons is scaled in dependence on the geographical distance to a central point of the central window. This embodiment has the technical advantage that the size of the objects is scaled.

According to a second aspect, a system for processing geographical information is provided. The system includes a memory for storing geographical information including a map dataset and associated context dataset. The system also includes a processor for extracting a central window subset based on the map dataset and the associated context dataset from the memory and for extracting a frame window subset based on the associated context dataset that is adjacent to the central window subset from the memory. The system includes a graphics memory for receiving the central window subset and the frame window subset. The system has the same technical advantages as the method according to the first aspect.

In one embodiment of the system, the processor is configured to project the associated context dataset on the side faces of a square or rectangular frustum. This embodiment has the technical advantage that distances and angles may be recognized easily.

According to a third aspect, a computer program product loadable into a memory (e.g., a non-transitory computer-readable medium) of a computer is provided. The computer program product includes software code portions for executing the method according to the first aspect when the computer program product is run on the computer.

BRIEF DESCRIPTION OF THE DRAWINGS

Embodiments of the system and methods are illustrated in the figures that are described below:

FIG. 6 shows a schematic representation of one embodiment of a computer;

FIG. 7 shows an exemplary zooming pyramid;

DETAILED DESCRIPTION

Figure 1:
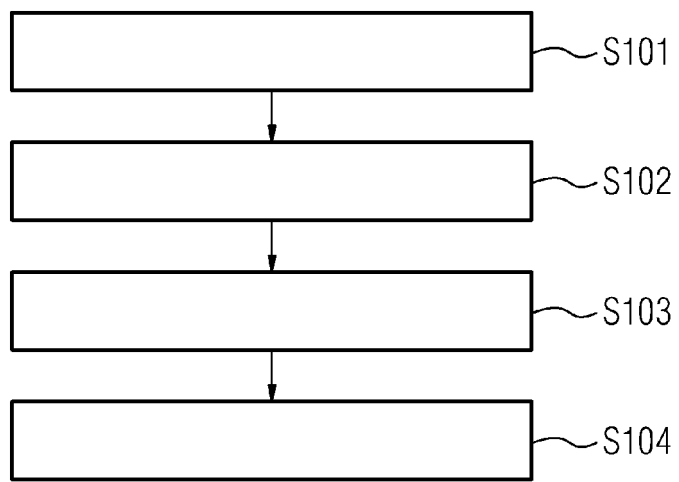
FIG. 1 shows a block diagram of one embodiment of a method.

FIG. 1 shows a block diagram of one embodiment of a method for processing geographical information. The method includes the act S101 of storing geographical information including a map dataset and associated context dataset in a memory. The method also includes act S102 of extracting a central window subset based on the map dataset and the associated context dataset from the memory. In act S103, a frame window subset based on an associated context dataset that is adjacent to the central window subset is extracted from the memory, and in act S104, the central window subset and the frame window subset are transferred to a graphics memory.

The map dataset includes data of geographical maps or aerial images. In contrast, the context dataset includes geographical positions of movable or non-movable objects (e.g., cars, planes, service teams etc.). The context dataset includes geographical coordinates of objects and the type or status of the objects.

Figure 2:
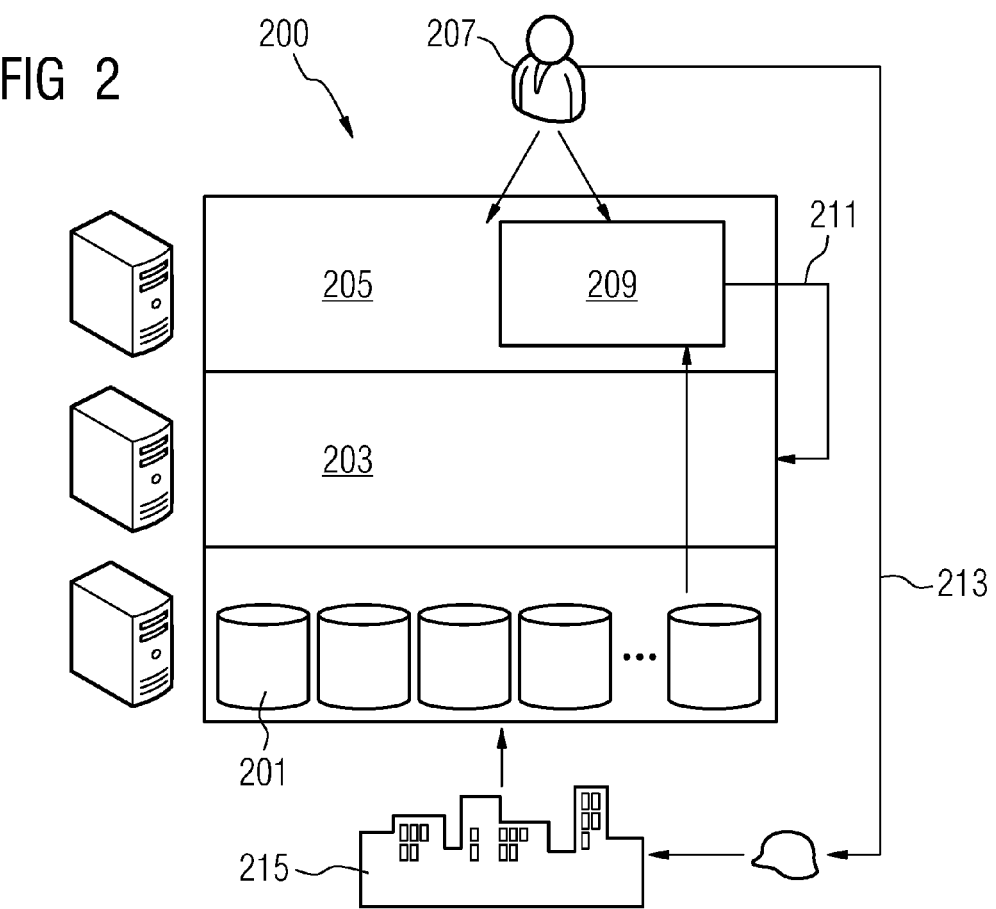
FIG. 2 shows a schematic view of one embodiment of a system.

FIG. 2 shows a schematic view of one embodiment of a system 200 for processing geographical information. The system 200 supports a central focus view as well as a surrounding context view. The system 200 includes a plurality of databases 201 as a memory for storing context datasets (e.g., from sensors, weather, service personnel or construction sides and map datasets). Data is extracted by an automatic system 203 and transferred to an operation center 205.

The operation center 205 provides a representation 209 of a central window subset based on the map data set and the associated context dataset from the databases 201 in combination with a frame window subset based on the associated context dataset that is adjacent to the central window subset from the databases 201. The representation is displayed to a controller 207.

In a feedback loop 211, new automation rules may be applied. In a supporting loop 213, located failures of the underlying infrastructure 215 may be fixed. In optimizing an automatization process, failures are to be fixed immediately. The failure cause is to be detected in short time in order to prevent further damages. Having identified the cause of failures policies and rules may be developed. The policies or rules may be automatically integrated into the automatization process. In this case, the automatization system may give alert even in advance of failure cause.

The system 200 may, for example, be integrated into the whole system of a network operator. Context data flow into the system 200, in which the context data is processed automatically and inspected interactively by the controller 207. In this way, automatic fault repair systems may be optimized.

In a control center, a human operator is supported to more reliably identify and fix sources of fault and to instruct service personnel based on geographic information. In addition, automation purposes may be identified more easily within the geographic information.

Figure 3:
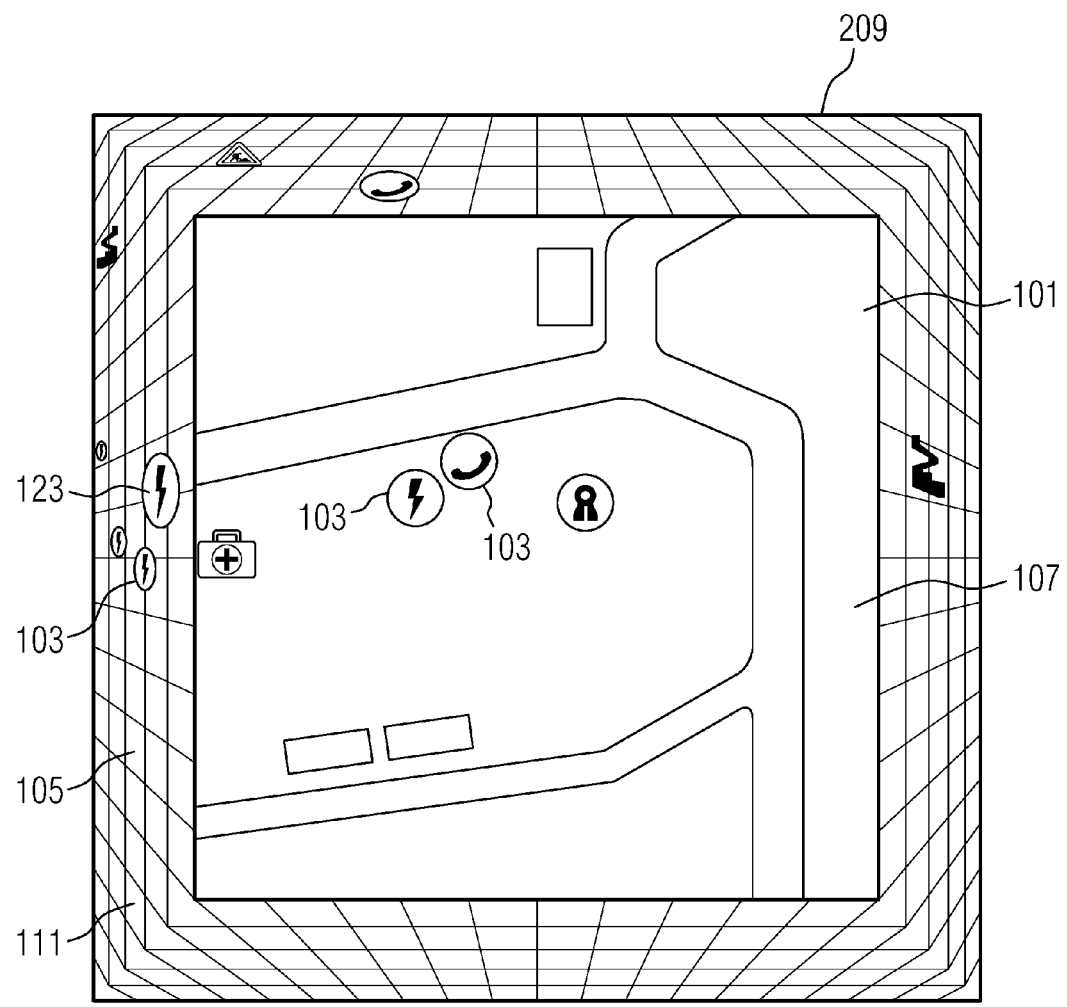
FIG. 3 shows a representation of exemplary graphic information.

FIG. 3 shows a top view of a representation 209 of exemplary geographic information based on a central window subset 101 and a surrounding frame window subset 105 distorted by projection on a frustum or a pyramid.

Instead of a curved distortion function, a plane 3D-mapping is used that projects the associated context dataset 103 on the side faces 111 of the square or rectangular frustum so that context data 103 (e.g., objects 123) are arranged in a frame around the central window 101. This is an approach to a 3D projection (e.g., a 3D effect).

The central window dataset 101 is based on map datasets 107 as well as on overlapping context datasets 103. The central window subset 101 is provided and projected on the top face of the frustum. Using a plane 3D-mapping allows a user to intuitively recognize realistic distances of objects 123 as defined in the context dataset 103.

The top face of the frustum includes a plane and non-distorted central window 101 based on a map dataset 107 as well as an associated context dataset 103 extracted from the memory. In contrast, the side faces 105 of the frustum represent a frame window subset 105 based on merely the associated context dataset 103 that is adjacent or surrounds the central window 101. Map datasets 107 are not shown in the frame window 105. This reduces the amount of data to be transferred to a graphics memory or graphics processor.

The central window 101 and the frame window 105 are constructed spatially and calculated by a computer having a processor, a memory for storing graphics information, and a graphics memory for storing information to be displayed on a screen.

The shown frustum is anticipated as a projected 3D object, the dimensions of which (e.g., height, depth, breadth, size or slope) may be estimated by a user easily. This may also be improved by an overlying grid, perspectively fading icons, an incidence of light or resulting shades. The positions of objects 123 of the context dataset 103 may thus be represented more appropriate in the frame window 105.

For improving scalability or reducing an amount of data, visual aggregation methods may be used. Aggregation methods represent several objects 123 as a single icon and eliminate redundant information. Further, these aggregation methods avoid multiple overlapping objects 123.

The system 200 has the advantage that good scaling characteristics with respect to the number of objects 123 within the context data 103 are realized. Geographic information is readable intuitively, fast and precisely so that distances and angles between objects 123 may be recognized easily.

High scalability in terms of the number of objects 123 is provided by a natural fading away representation of objects 123 in dependence of distance in a perspective view. Spatial semantic zoom may be reached by showing distant objects 123 with low resolution or in miniaturization. However, objects 123 of the context dataset are still interpretable.

Intuitive and precise estimation of distances and angles of the objects 123 represented by the context data set 103 in relation to the central window subset 101 and with respect to each other is reached by using 3D mappings for generating realistic views and 3D clues. 3D perspective may be readily reconstructed by a user.

Software for outage management may be improved by the method so that causes of power outages may be found and fixed in a faster manner. In addition, the method may be applied in mobile devices (e.g., pagers or smart phones (for supporting service crews)).

Figure 4:
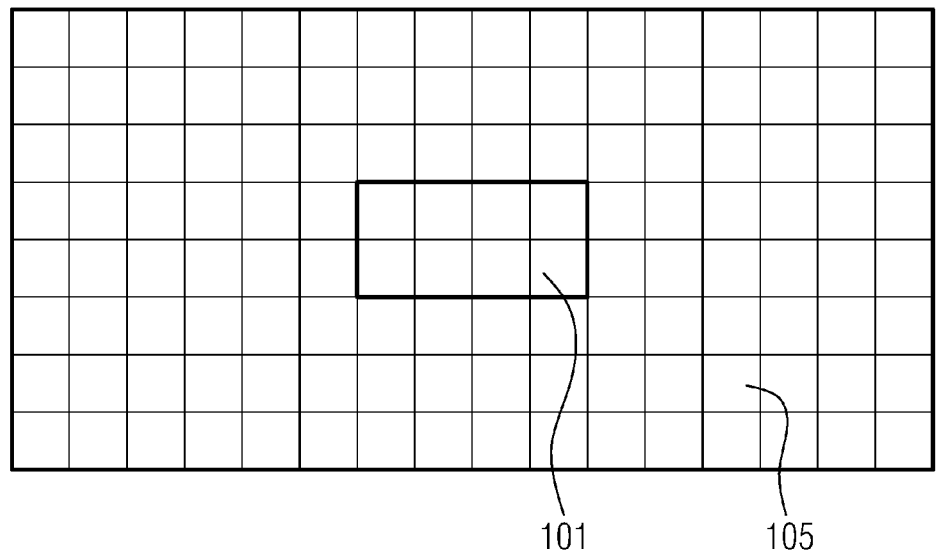
FIGS. 4 and 5 show an exemplary grid representation.
Figure 5:
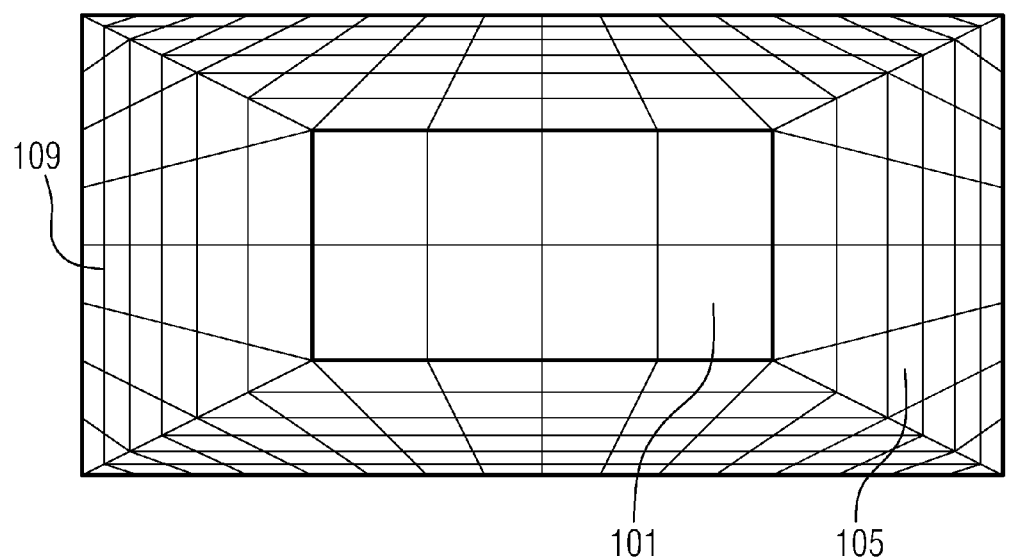

FIGS. 4 and 5 show an exemplary grid representation of the geographical information. The central window subset 101 is enlarged in all dimensions by a factor of k. However, the aspect ratio is maintained, and the central point of the central window 101 is maintained.

The distance between the grid lines 109 within the central window 101 is also enlarged by a factor of k. Their relative distance with respect to the side lines of the rectangular central window 101 is unchanged.

Gridlines 109 are drawn using a vanishing point projection in the frame window subset 105. Gridlines 109 allow a better estimation of distances and angles of objects 123, as defined in the context dataset 103.

In an algorithmic realization, the new position of points is reconstructed in distorted space. The central window 101 includes map data on which associated context data is superposed. When zooming, the central window 101 objects 123 of the associated context data 103 move away from the center of the central window 101 (e.g., objects 123 move out from the central window 101 and appear in the frame window 105). In terms of algorithmic characteristics, this procedure is similar to off-screen techniques. Objects 123 and data points of the context data 103 are to be projected back to the central window 101.

The algorithm includes four acts.

In a first act, the size of the frame window 105 having context data 103 is calculated. The idea of an optical lens is to enlarge the central window 101 and to maintain the context of the objects 123, but to squeeze out the objects 123 from the central window 101 during magnifying.

By using a semantic zoom of the map data, not only data representations are updated, but also details from the map itself. The context area is enlarged in synchronization with increasing detail, as given by the corresponding magnification level. When magnifying the view, objects 123 move away from each other, and a larger area is required to represent distances correctly without generating too many distortions or overlappings. The size of the frame window 105 is calculated separately for each side in dependence on distance to the outer limit of the dataspace and the magnification factor.

Fixed points are calculated on the outer edge of the representation window. The dataspace is enlarged in a geographical manner corresponding to each magnification level. In order to obtain the effect of a pyramidal frustum on which the top side shows the central window 101, the larger dataspace is to be scaled into the representation window. This act may be seen as a calculation of fixed points, since the dataspace includes a grid that is used for the representation of objects 123 (e.g., 3D cues) in the frame window 105 including the context data 103.

For correctly projecting this grid, fixed points of the grid are used on the outer representation window. Grid lines 109 that are scaled horizontally and vertically in combination with the magnification intersect the border of the representation window at several points. These points are used as fixed points of the grid on the outer border of the representation window.

The movable fixed points within the central window 101 are calculated. For constructing the grid in the frame window 105, additional fixed points at the inner area of the frame window 105 are used. These fixed points correspond to the intersection between grid lines 109 of the non-scaled grid with the inner frame window 105.

The grid lines of the translated grid lying within the central window 101 with the inner frame window 105 are cut.

Distortion is calculated based on the grid. In the previous act, the fixed points of the inner and outer frame window 105 have been calculated.

Following acts are performed for construction of the grid.

An ID is assigned to a horizontal and a vertical line. Same ID is assigned to corresponding fixed points. Fixed points having the same ID are connected to each other in each of the four sections of the frame window 105, vertically as well as horizontally.

Grid lines 109 parallel to the central window 101 are scaled accordingly. In left and right sections of the frame windows 105, these grid lines 109 are vertical, whereas in the upper and lower section of the frame window 105, these grid lines 109 are horizontal.

In a next act, intersection points of the scaled grid lines 109 with the diagonal separating lines between the four sections of the frame window 105 are calculated. These intersection points are connected with the corresponding fixed points of the adjacent side. The fixed points are projected and scaled in correspondence to the position of the grid cells into the frame window 105.

FIG. 6 shows a schematic representation of one embodiment of a computer 113 for performing the method. The computer 113 may include a computer program product that is loadable into the internal memory 115 (e.g., a random access memory) of the computer, including software code portions for performing any of the aforementioned method acts when the product is run on the computer. In addition, the computer includes a graphics memory 117 for storing graphic content data (e.g., a video random access memory).

The computer 113 may be implemented by hardware or firmware and may be programmed to carry out a set of arithmetic or logical operations automatically based on software code portions. The computer 113 includes the internal memory 115 (e.g., a random-access memory chip) that is coupled by an interface 119 (e.g., an IO bus) with a processor 121. The processor 121 is the electronic circuitry within the computer 113 that carries out the instructions of the software code portions by performing the basic arithmetic, logical, control and input/output (I/O) operations specified by the instructions. The processor 121 thus accesses the software code portions that are stored in the internal memory 115.

FIG. 7 shows a zooming pyramid. In order to build an adaptive frame window 105, the following acts are performed. The size of the frame window 105 in relation to the dataspace 125 is determined. The off-screen dataspace is scaled and mapped to the frame window 105. An ancillary geometric grid that is mapped to the frame window 125 is used, and data points are mapped with the help of this grid.

Before describing the computation of the border size, the coordinate system is fixed. Latitude and longitude is used to position data points on the map. However, all calculations take place in pixel coordinates in the Cartesian coordinate system.

To compute the size of the frame window 105, the dataspace 125 as a subset of the off-screen space is considered. If the dataspace 125 is completely included in the central window 101, the size of the frame window 105 is null. Otherwise, the size is adapted to the extent of the dataspace 125.

A rectangular central window 101 is used to meet the requirement of a space-filling visualization, since important space would be wasted if a circular central window would be applied to a rectangular screen. This allows the frame window 105 to be divided into four areas (e.g., top, left, bottom, right) and the size of each area to be calculated individually.

As a result, each side of the frame window 105 expresses the amount of dataspace 125 that is located off-screen on that particular side. Therefore, the distance of each side of the central window 101 to the outer bounds of the corresponding dataspace side is considered. The distance between top position of the central window 101 and top dataspace bounds impacts the size of the top frame window 105, the distance between left position of the central window 101 and left dataspace bounds impacts the size of the left frame window 105, and so on.

As the distances increase with higher-level zoom stages, the size of the frame window 105 also increases but is restricted by a user-defined maximum size, which is achieved at the highest zoom level. The user may change this maximum size at runtime. This adaptive frame window 105 is as follows:

$$size_i = \min\left\{1.0, \frac{d(dataSpace_i, viewport)}{dimension(dataSpace)}\right\} * \frac{maxDist * zoom}{maxZoom}$$

with i∈{top, left, bottom, right}. The calculation is divided into two parts: The first part determines the factor, which is applied to the second part; the second part determines the maximal possible size of the corresponding side of frame window 105 depending on the zooming scale.

The factor in the first part of the formula is the minimum of 1.0 and the ratio between the distance between the corresponding dataspace bounds and the central window 101 d(dataSpace$_i$,viewport) (e.g., distance between dataspace top bounds and central window and the respective dimension of the dataspace dimension dimension(dataSpace)). In case top or bottom size of the frame window 105 is calculated, the dimension of the dataspace 125 represents the height, and the width otherwise.

The maximum possible size of the corresponding side of the frame window 105 is derived by the ratio between maximum distance between the central window and dataspace bounds maxDist and the respective zooming level zoom and maximum possible zooming level maxZoom.

This behavior may be described using the metaphor of a zooming pyramid. The size of the frame window 105 increases along the pyramid when zooming and thus the magnification of the dataspace in pixel-coordinates. The maximum possible zooming level is defined somewhere along this pyramid. Common interactive map libraries allow a maximum zooming level of 18.

Figure 10:
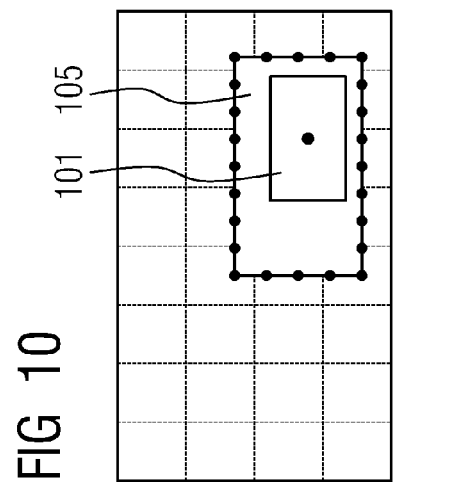
FIGS. 8 to 10 show exemplary scaling of the grid to the bounds/size of the central window.
Figure 9:
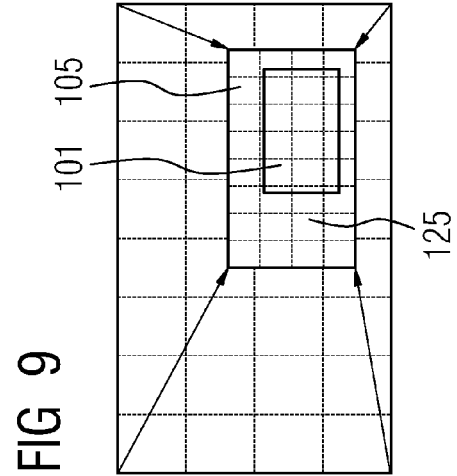
Figure 8:
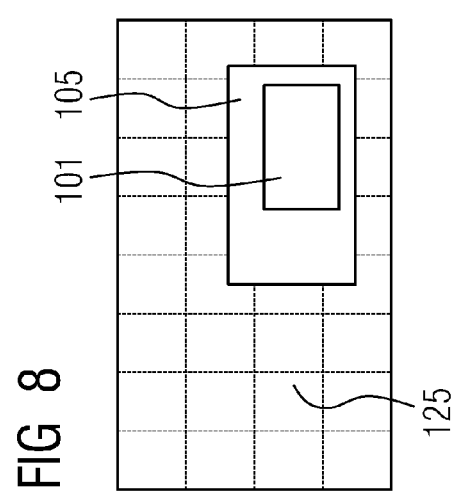

FIGS. 8 to 10 show exemplary scaling of the grid to the bounds/size of the central window. Data points are mapped and scaled using an ancillary grid. An ancillary grid on top of the dataspace 125 is used to keep track of changes of off-screen located data points in an interactive environment.

FIG. 8 shows a grid on top of the dataspace 125. The dimensions of the grid are the same as of the dataspace 125, and the amount of horizontal as well as vertical lines is user-defined. Considering the result of the mapping and scaling process, a pyramid effect is provided.

If a user is located at the top of the zooming pyramid, the user faces the focus and perceives each side of the pyramid vanishing at the very end of the pyramid (e.g., rock bottom).

Each side of the pyramid is considered separately, and each side has a separate vanishing point where all vanishing lines meet. The sides of the pyramid, vanishing in the distance from a user's point of view correspond to the frame window 105 to be constructed. The magnified grid is scaled and mapped into the frame window 105 and the central window 101.

The starting point is given by a number of performed zooming operations of the dataspace 125. At first, the dataspace is entirely included in the central window 101 (e.g., all data points are included in the central window 101). The dataspace 125 is rectangular and contains all data points. The user performs several zooming operations, as a consequence of which the dataspace 125 increases by dimension in pixel-coordinates and exceeds the size of the display.

FIG. 8 shows the state after performing zooming operations. The dataspace exceeds the size of the display. In order to obtain the effect of a pyramid, the part of the dataspace that exceeds the central window 101 is scaled into the derived frame window 105. Hence, first the entire grid is scaled into the display bounds.

FIG. 9 shows the scaled version of the grid. This allows fixing the points at the edge of the display (e.g., the outermost bounds of the visible space within the display, which operate as fixed points that intersect the vanishing lines).

FIG. 10 shows the fixed points as dots.

Figure 12:
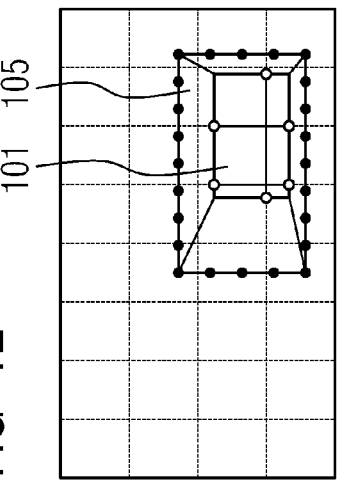
FIGS. 11 and 12 show exemplary computation of the magnified intersection points and the sides of the pyramid.
Figure 11:
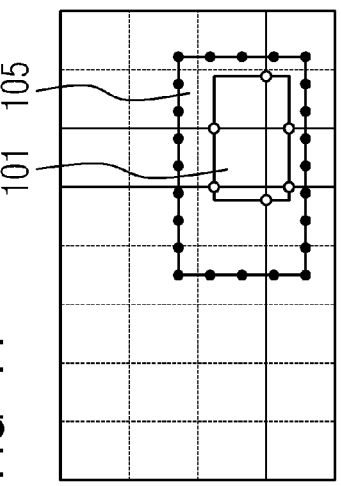

FIGS. 11 and 12 show computation of the magnified intersection points and the sides of the pyramid. The connection of these fixed points to the magnified grid inside the central window 101 is determined. Magnified grid lines are included in the central window.

The space is zoomed, providing that the central window 101 includes the magnified data representation, and frame window 105 contains all information that has been moved off-screen and is not visible anymore.

FIG. 11 illustrates the points of the magnified grid inside the central window 101. The pyramid includes four distinct sides.

FIG. 12 shows the magnified grid in the area of the central window 101 and the delimiter lines separating the four sides of the pyramid.

Having the fixed points of the scaled grid on the outermost side of the central window 101 and the fixed points of the magnified focus, construction of the scaled grid in the frame window 105 is started.

For the construction of the vanishing grid, an ID is assigned to each horizontal and vertical line of the grid. All fixed points as well as future determined intersection points, etc. have the same ID. All necessary fixed points and intersection points are calculated first, and then all points are connected by ID.

Figure 13:
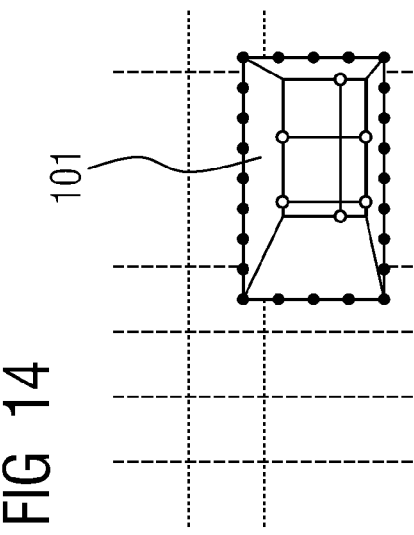
FIGS. 13 to 19 show exemplary construction of the vanishing grid lines.

FIGS. 13 to 19 show construction of the vanishing grid lines and the entire construction process. FIG. 13 shows the entirely magnified grid and the corresponding display with the central window 101 and frame window 105. The horizontal lines, considered off-screen, are dotted. The vertical lines that are considered off-screen are dashed.

Figure 14:
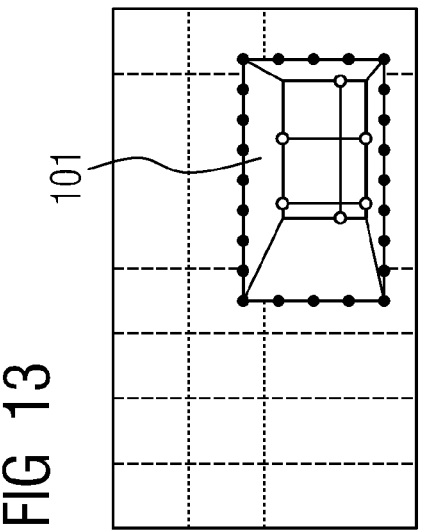

FIG. 14 shows considered lines. These lines are next projected to the frame window 105. Therefore, each side is considered separately (e.g., lines placed top of the central window 101, left of the central window 101, bottom of the central window 101, and right of the central window 101).

Only lines parallel to the corresponding side are considered. The dotted lines are parallel to the top frame window 105 and are to be projected to the top frame window 105. The four dashed lines on the left are parallel to the left frame window 105. The dashed line on the right is parallel to the right frame window 105.

Figure 15:
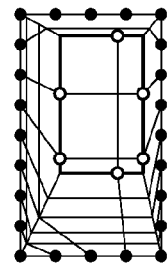

FIG. 15 shows the result of projecting these parallel lines to the corresponding area of the frame window 105. A fish-eye approach is used to project and scale the lines to the frame window 105. The resulting position P$_{feye}$ in fisheye coordinates is derived by the following formula:

$$P_{feye}(v, f) = \frac{d+1}{d + \frac{D_{max}}{D(v, f)}} * D_{max} + f$$

v is the position of the object to be projected. f is the position of the focus. D$_{max}$ represents the distance to the corresponding outer bounds of the dataspace, and D(v,f) is the distance between v and f. This formula is applied in X-direction for the vertical lines (left, right) and in Y-direction for all horizontal lines (top, bottom).

Figure 16:
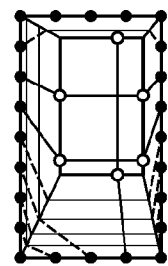

In FIG. 16, in each border of the area of the frame window 105, the fixed points that hold the same line ID are connected. The newly added lines are dashed. The intersection points between projected lines and the delimiter lines of the pyramid sides are calculated.

Figure 17:
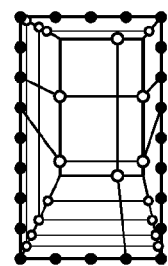

In FIG. 17, these intersection points are marked and are shown as dots. The intersection points are determined in order to determine the lines over the edge of the pyramid sides.

Figure 18:
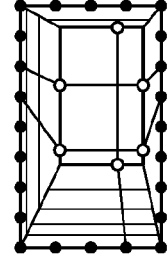
Figure 19:
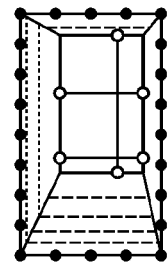

In FIG. 18, the intersection points on the delimiter line with the fixed points are connected. As an example, the left area of the frame window 105 is considered. The vertical lines in the left area intersect the delimiter line to the top area of the frame window 105 in four points. As described before, all fixed and intersection points have the ID of the corresponding line. These four points are connected with the fixed points of the top area of the frame window 105 that has the same ID. This is repeated for each side of the frame window 105 and each delimiter line. In FIG. 19, the result is shown.

Figure 20:
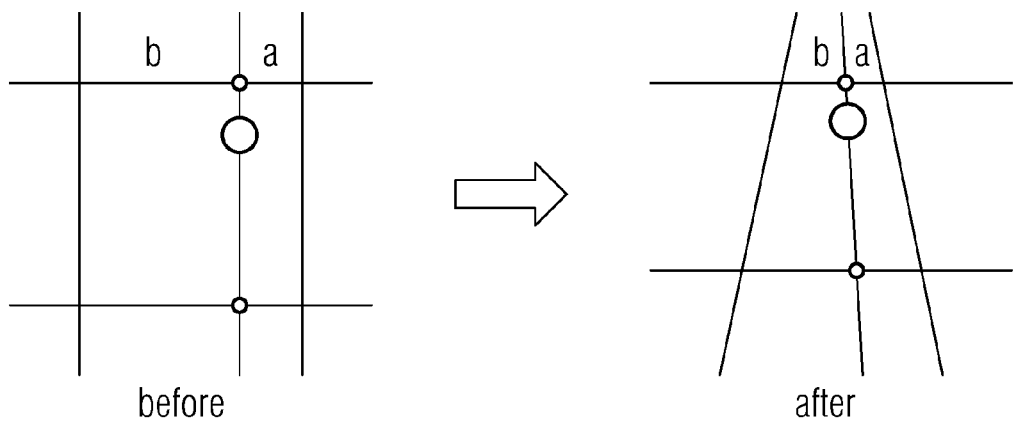
FIG. 20 shows exemplary computation of a position.

FIG. 20 shows computation of a position. The grid was projected independently from the actual data points. However, data points are projected depending on the grid.

To describe this process, the process is exemplified for the top area of the frame window 105. As for the horizontal grid lines, the fisheye projection is applied in Y-direction to the data point. As a result, the data point is assigned a new Y-position. Next, the X-position is computed. The X-position is computed as follows.

Before the grid is distorted, the ratio between a and b is stored. After the distortion, the same ratio of a and b is applied to the enclosing top and bottom lines of the data point. If this newly derived vertical line is intersected with the horizontal line on the level of the Y-position of the data point, the final X-position of the data point is obtained. The scaling of the size of the data point is also derived by the fisheye formula.

All features discussed or shown with respect to particular embodiments may be provided in various combinations in order to simultaneously realize advantageous effects.

All method steps may be implemented by corresponding devices configured for performing the respective method step. All functions provided by particular devices may be a method step of the method.

The scope of protection is given by the claims and is not restricted by features discussed in the description or shown in the figures.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for processing geographical information, the method comprising:
storing geographical information comprising a map dataset and an associated context dataset in a memory;
extracting a central window subset based on the map data set and the associated context dataset from the memory;
extracting a frame window subset based on the associated context dataset that is adjacent to the central window subset from the memory, the frame window subset comprising a plurality of sides of a frame window, wherein each side of the plurality of sides is individually sized;
calculating the frame window subset from the associated context dataset, wherein the calculating comprises projecting the associated context dataset on side faces of a square or rectangular frustum as the frame window, wherein each side of the plurality of sides of the frame window is separately sized based on a magnification factor of a dataspace and a respective distance to a respective outer limit of the dataspace, wherein the dataspace represents a geographical area containing the map dataset and the associated context dataset, wherein objects defined by the associated context dataset are represented as perspectively fading icons, and wherein a size of the icons is scaled in dependence on a geographical distance to a central point of the central window; and
transferring the central window subset and the frame window subset to a graphics memory after the calculating of the frame window subset.

2. The method of claim 1, wherein the frame window subset surrounds the central window subset.

3. The method of claim 1, wherein the context dataset is updated dynamically.

4. The method of claim 1, further comprising displaying the central window subset and the frame window subset on a screen.

5. A system for processing geographical information, the system comprising:
a memory configured to store geographical information comprising a map dataset and associated context dataset;
a processor configured to:
extract a central window subset based on the map data set and the associated context dataset from the memory;
extract a frame window subset based on an associated context dataset that is adjacent to the central window subset from the memory, the frame window subset comprising a plurality of sides of a frame window, wherein each side of the plurality of sides is individually sized;
calculate the frame window subset from the associated context dataset before a transfer to a graphics memory, the calculation of the frame window subset comprising projection of the associated context dataset on side faces of a square or rectangular frustum as the frame window, wherein each side of the plurality of sides of the frame window is separately sized based on a magnification factor of a dataspace and a respective distance to a respective outer limit of the dataspace, wherein the dataspace represents a geographical area containing the map dataset and the associated context dataset, wherein objects defined by the associated context dataset are represented as perspectively fading icons, and wherein a size of the icons is scaled in dependence on a geographical distance to a central point of the central window; and
a graphics memory configured to receive the central window subset and the frame window subset.

6. In a non-transitory computer-readable storage medium that stores instructions executable by a computer to process geographical information, the instructions comprising:
storing geographical information comprising a map dataset and an associated context dataset in a memory;

extracting a central window subset based on the map data set and the associated context dataset from the memory;

extracting a frame window subset based on the associated context dataset that is adjacent to the central window subset from the memory, the frame window subset comprising a plurality of sides of a frame window, wherein each side of the plurality of sides is individually sized;

calculating the frame window subset from the associated context dataset, wherein the calculating comprises projecting the associated context dataset on side faces of a square or rectangular frustum as the frame window, wherein each side of the plurality of sides of the frame window is separately sized based on a magnification factor of a dataspace and a respective distance to a respective outer limit of the dataspace, wherein the dataspace represents a geographical area containing the map dataset and the associated context dataset, wherein objects defined by the context dataset are represented as perspectively fading icons, and wherein a size of the icons is scaled in dependence on a geographical distance to a central point of the central window; and transferring the central window subset and the frame window subset to a graphics memory after the calculating of the frame window subset.

7. The non-transitory computer-readable storage medium of claim 6, wherein the frame window subset surrounds the central window subset.

8. The non-transitory computer-readable storage medium of claim 6, wherein the context dataset is updated dynamically.

9. The non-transitory computer-readable storage medium of claim 6, wherein the instructions further comprise displaying the central window subset and the frame window subset on a screen.

\* \* \* \* \*